United States Patent
Ali

(10) Patent No.: US 6,915,027 B2
(45) Date of Patent: Jul. 5, 2005

(54) METHOD AND AN APPARATUS TO SPEED THE VIDEO SYSTEM OPTIMIZATION USING GENETIC ALGORITHMS AND MEMORY STORAGE

(75) Inventor: Walid Ali, Montrose, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 623 days.

(21) Appl. No.: 10/124,011

(22) Filed: Apr. 17, 2002

(65) Prior Publication Data

US 2003/0198405 A1 Oct. 23, 2003

(51) Int. Cl.$^7$ ................................................ G06K 9/60
(52) U.S. Cl. ....................................... 382/307; 382/305
(58) Field of Search ................................ 382/305, 307, 382/298, 275, 168, 254, 232, 128; 358/1.2; 375/240.26; 703/1

(56) References Cited

U.S. PATENT DOCUMENTS

| | | | | |
|---|---|---|---|---|
| 5,745,363 A | * | 4/1998 | Rostoker et al. | 700/121 |
| 5,819,244 A | * | 10/1998 | Smith | 706/13 |
| 5,870,313 A | * | 2/1999 | Boyle et al. | 716/10 |
| 6,148,274 A | * | 11/2000 | Watanabe et al. | 703/6 |
| 6,493,658 B1 | * | 12/2002 | Koford et al. | 703/1 |

* cited by examiner

Primary Examiner—Kanjibhai Patel
(74) Attorney, Agent, or Firm—Edward W. Goodman

(57) ABSTRACT

A system and method for speed the video system optimization using genetic algorithms and memory storage, whereby previously evaluated chromosomes, and their associated image quality, are stored in a memory unit for fast retrieval, such as a hash table, to create a large savings of processing time for previously evaluated chromosomes (variations of video systems) that do not have to be re-tested. The steps may include (a) providing a video processing system that utilizes a heuristic optimization framework for video image evaluation of a video image input including a plurality of genetic algorithms; (b) testing a plurality of system optimization designs comprising unique combinations of the plurality of genetic algorithms applied to optimize the video image so as to result in plurality of modified images; (c) assigning a fitness value to each of the plurality of system optimizations in step (b) based on an objective image quality metric evaluation of the modified images; (d) storing each of the tested system optimization designs including a respective modified image and associated fitness value in a memory; (e) determining whether a proposed system optimization design includes one or more particular combinations of genetic algorithms that have been previously tested in step (b) and stored in the memory; and (f) retrieving the results of the tested system optimization design comprising the one or more particular combinations of genetic algorithms to find an optimum solution for the subsequent video image evaluation.

16 Claims, 3 Drawing Sheets

METHOD AND AN APPARATUS TO SPEED THE VIDEO SYSTEM OPTIMIZATION USING GENETIC ALGORITHMS AND MEMORY STORAGE

BACKGROUND OF THE INVENTION

1. Field of the Invention

The present invention is related to systems and methods for evaluating and implementing video quality. In particular, the present invention is related to a method and apparatus to speed the video system optimization using genetic algorithms and memory storage.

2. Description of the Related Art

The use of genetic algorithms to evaluate video quality, which may or may not be part of a feedback system in which video quality is enhanced, has been proposed by the present inventor in U.S. application Ser. No. 09/817,981 entitled "A General Scheme for Diffusing Different Implementations of a Number of Video Algorithms in an Optimum Way for Best Objective Video Quality" (filed Mar. 27, 2001), and U.S. application Ser. No. 09/734,823 entitled "A Scalable Dynamic Metric For Automatic Evaluation of Video Quality" (filed Dec. 12, 2000), the contents of both applications are hereby incorporated by reference.

In these aforementioned applications, the primary goal of improving video quality evaluation includes providing a series of objective quality video modules, each module comprising a particular type of algorithm capable of providing objective video quality assessment.

In the prior art, video systems consist of a large number of video functions (for example, sharpness enhancement, noise reduction, color correction . . . etc.). As each of these video functions may require a number of control parameters, the combination of implementations for each of the functions is potentially vast, and the order of application can be unclear. Moreover, the total possible configurations can be excessively large, with each configuration resulting in a particular image quality that is in some way different from all the other combinations.

The previously cited patent applications, while offering novel and nonobvious ways to evaluate quality, are nonetheless hindered in the time required to process and evaluate the combinations. In other words, the execution time of genetic algorithms can be excessive, particularly if the image is a live broadcast, or there are a series of rapidly changing scenes that would require evaluation.

SUMMARY OF THE INVENTION

Accordingly, the present invention provides a system and method for speed the video system optimization using genetic algorithms and memory storage, whereby previously evaluated chromosomes, and their associated image quality, are stored in a memory unit for fast retrieval, creating a large savings of processing time for previously evaluated chromosomes (variations of video systems) that do not have to be re-tested.

According to a first aspect of the invention, a method for decreasing the time of Video Optimization, comprising the steps of:

(a) providing a video processing system that utilizes a heuristic optimization framework for video image evaluation of a video image input, wherein said video processing system includes a plurality of genetic algorithms;

(b) testing a plurality of system optimization designs comprising unique combinations of the plurality of genetic algorithms applied to optimize the video image so as to result in plurality of modified images;

(c) assigning a fitness value to each of the plurality of system optimizations in step (b) based on an objective image quality metric evaluation of the modified images;

(d) storing each of the tested system optimization designs including a respective modified image and associated fitness value in a memory;

(e) prior to performing a subsequent video image evaluation, determining whether a proposed system optimization design comprises one or more particular combinations of genetic algorithms that have been previously tested in step (b) and stored in the memory; and one of:

(f)(i) retrieving the results of the tested system optimization design comprising said one or more particular combinations of genetic algorithms to find an optimum solution for the subsequent video image evaluation; or (f)(ii) testing any combination of genetic algorithms for optimizing the subsequent video image evaluation that had not been previously tested and stored in step (b); and (g) finding an optimum solution for the subsequent video image evaluation based on results from step (f).

According to another aspect of the invention, the storing performed in step (d) can be in a hash-table.

In addition, step (f)(ii) further comprises storing test results of said any combination of genetic algorithms tested in step (f)(ii) in said memory.

The video image input in step (a) can be a broadcast image, a previously recorded image, or a compressed image.

The testing in step (b) can be performed by a system optimization unit. The assigning of fitness values in step (c) can be performed by an objective image quality metric module.

In addition, the evaluation of video images by the objective image quality metric can be fed back to the system optimization unit.

According to yet another aspect of the present invention, a system for decreasing the time of Video Optimization when using genetic algorithms comprises:

means for receiving a video image input;

a video optimization unit including a genetic algorithm module comprising a plurality of genetic algorithms;

an objective image quality metric unit for evaluating an image quality of the video image processed by the video optimization unit according to at least one genetic algorithm and for assigning a fitness value to said video image processed by the video optimization unit;

a storage unit for storing data regarding the image evaluated by the objective image quality metric unit and the associated fitness value of a particular combination of genetic algorithms associated with a system optimization design, wherein the data stored by the storage unit is retrievable for subsequent use when said particular combination of genetic algorithms is to be used to process a subsequent video image.

The storage unit comprises a hash-table. The genetic algorithms in said video optimization unit optimize a plurality of video features including spatial scaling, histogram modification, adaptive peaking and noise reduction. The storage unit stores the image along with the evaluation of the image quality.

The system may further comprise detection means for detecting whether said particular combination of algorithms has been previously stored in the storage unit. Additionally, the means for receiving can include means for receiving a video broadcast.

Finally, the means for receiving includes means for receiving a video stream.

DETAILED DESCRIPTION OF THE INVENTION

Genetic algorithms are iterative procedures that will maintain a number (population) of video system designs (candidate solutions) encoded in the form of chromosome strings. The initial population can be selected heuristically or randomly, and its chromosome defines each member (video system design) in a generation (A number of system designs).

Figure 1:
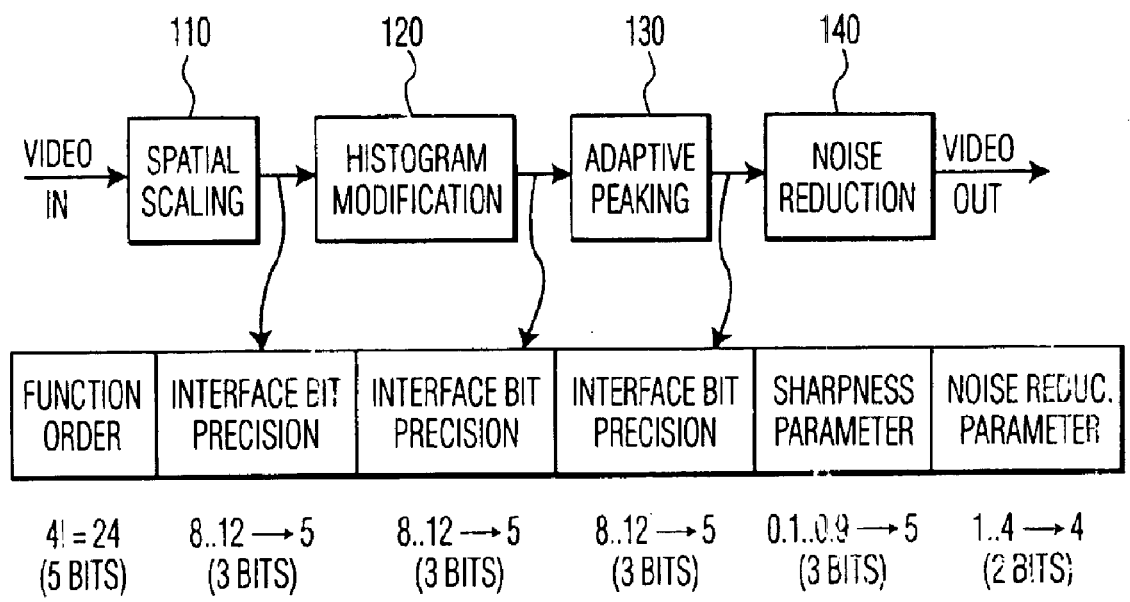
FIG. 1 illustrates a representation of a video system by a binary chromosome.

FIG. 1 shows an embodiment of the representation of a video system according to genetic algorithms by utilizing a binary chromosome (it is to be understood by artisans that the layout of the system and components are shown for purposes of illustration and not for limitation). The binary chromosome comprises a spatial scaling feature 110, a histogram modification feature 120, an adaptive peaking feature, and a noise reduction feature. It should also be understood that this representation also captures the architectural design, namely, the order of the different video components (e.g. the system shown has the order of scalar, histogram modification, peaking and noise reduction) as well as the data bus width in between two cascaded components.

For each generation for video system designs, each candidate is evaluated and is assigned the fitness value, which represents how good (or bad) is the resulting image quality. The image quality is measured by an objective metric, which is a subsystem that tries to mimic the human vision system to decide on the quality of images.

This image quality is generally a function of the decoded bits contained in each candidate's chromosome. Genetic algorithms select some of these candidates for the reproduction in the next generation based on their fitness values (e.g. how good is the image quality resulting from this system). The selected candidates are combined using the genetic recombination operation cross over and mutation. The termination criteria are triggered when finding an acceptable approximate solution, reaching a specific number of generations, or until the solution converges.

Since the most time consuming process is in evaluating the resulting image quality out of a video system by the objective image quality metric, we propose to use a fast retrieval memory mechanism (e.g., a hash table) to store each tested chromosome (video system) that has been evaluated together with its associated image quality. Utilizing the memory unit for storing and later retrieving the tested chromosome prevents a lot of costly evaluations, which results in a slowing down of the overall optimization process. In general, if genetic algorithms need to be used to find the fitness (image quality) of N video designs, out of which m only M are not tested before, then we expect to get a gain in computation time:

$$\Delta T = (N-M)T_{eval} - N*T_{look-up} - M*T_{update} \quad (1)$$

$T_{eval}$ is time of a single evaluation, $T_{look-up}$ and $T_{update}$ are times required to find a record in memory and write a record, respectively. The gain is positive if $$T_{eval} > \frac{N*T_{look-up} + M*T_{update}}{N - M}. \quad (2)$$

When dealing with video systems, where the evaluation time may extend to tens of minutes, a significant savings in time can be realized with the present invention, as the look-up and update time from a hash table is on the order of nano-seconds, as opposed to the above-mentioned tens of minutes for evaluation time!

Figure 2:
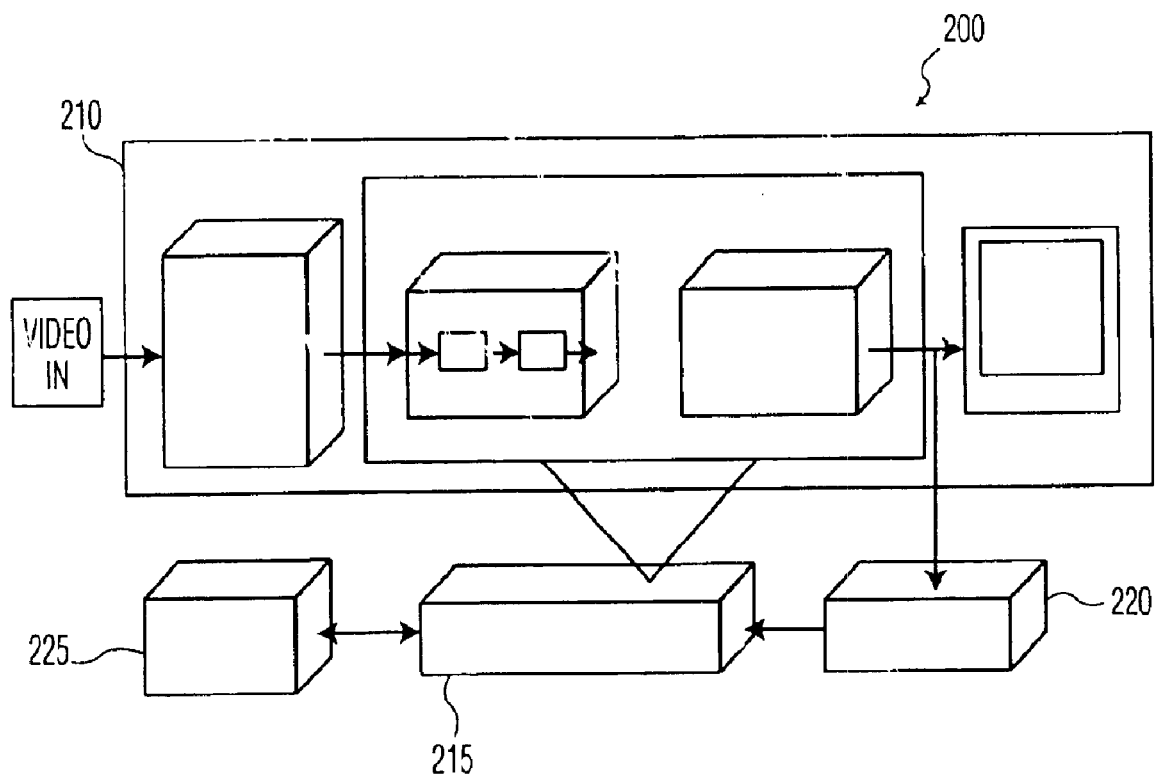
FIG. 2 illustrates a video system configuration utilizing a memory unit to speed the optimization carried out using genetic algorithms.

FIG. 2 illustrates components of a system that include a hashing table. According to FIG. 2, it can be seen that there is video processing component 210 to which a video stream is input. An optimization unit comprising a genetic algorithm module 215 includes a series of video processing algorithms (genetic algorithms are illustrated, but an artisan appreciates that other types of video processing algorithms could be used) are used.

The optimization unit 215 configures the control parameter settings for each of the video processing algorithms. An objective quality metric unit 220 provides a scalable dynamic objective metric for automatically evaluating video quality. The output of video stream from the optimization unit 215 is fed back to the objective quality metric unit 220. While it is true that objective metrics can be "double ended" (meaning that video quality is evaluated using a first original video image and a second process video image, which are compared to evaluate quality by determining changes in the original video image) or "single ended" (meaning that an algorithm is applied to evaluate its quality), in the presently claimed invention, it is the single ended type of objective metric that is used.

In addition, a memory unit 225, which in a best mode is a hashing table, (but it should be understood that the memory unit is not limited to hashing tables, and may comprise any known type of memory) that stores results of the different combinations of algorithms and the associated image quality evaluation. So long as the memory unit has a fast retrieval time, the storage of the evaluations prevents the recurrence of processing use and time wasted to test and store each chromosome (video system) and perform an evaluation each time a video is input into the system. Also, when there are slight variations during the course of a video (For example, in one particular scene a person might be sitting in their office wearing a blue shirt. In another scene (presumably a day later or so) the same person could be wearing a different color shirt, or there could be slightly more light in the room because it is a sunnier day than the first evaluation, but the difference is so small that to go through the entire process of evaluating image quality would tend to slow down the optimization process while making small, perhaps unnoticeable to a human eye, changes to the image based on the slightly different scene from the second video as opposed to the first.

Figure 3A:
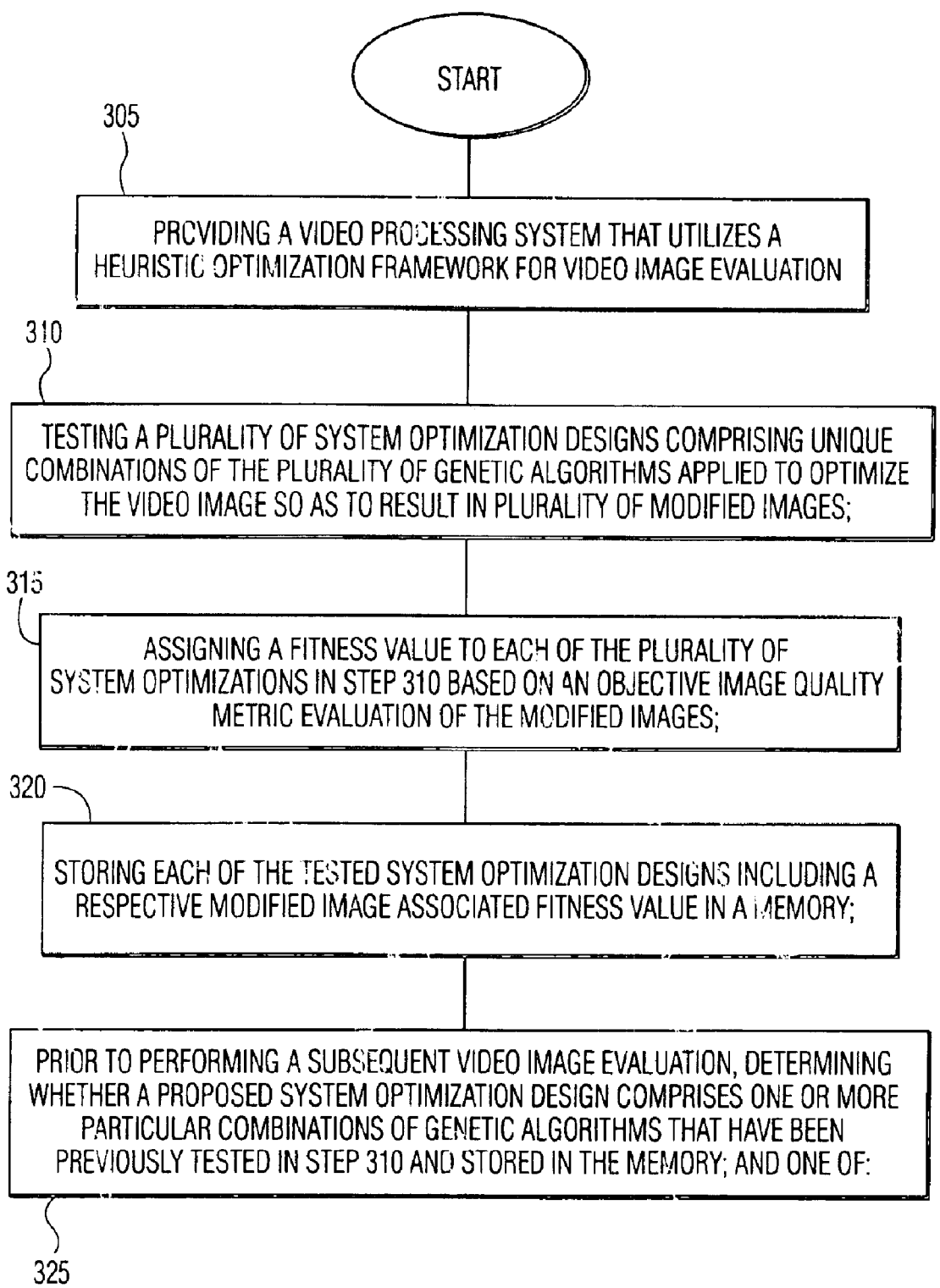
FIGS. 3A and 3B provide a flowchart illustrating a general overview of a method according to the present invention.
Figure 3B:
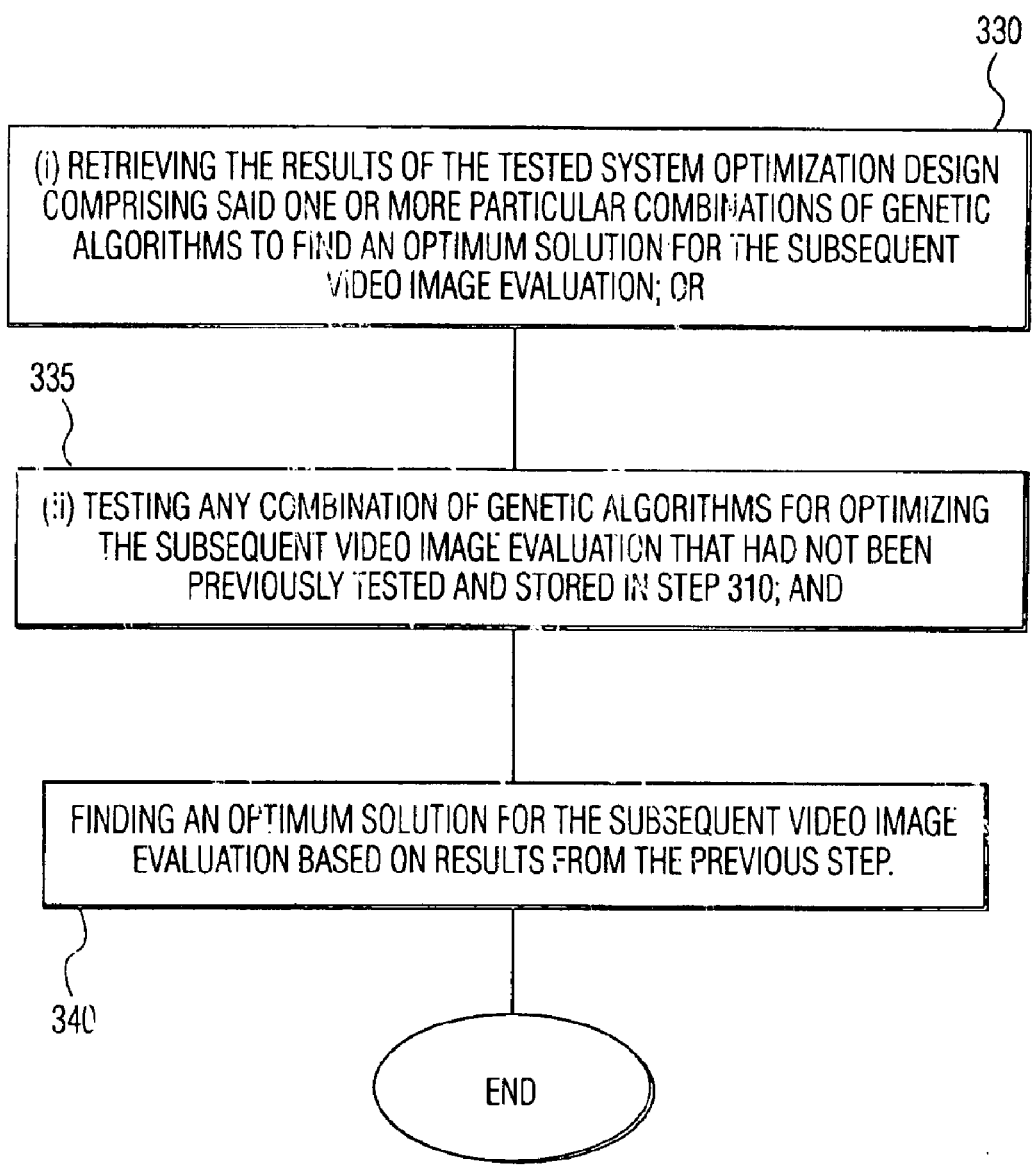

FIGS. 3A and 3B illustrate a general overview of a flowchart according to the present invention.

At step 305, a video processing system is provided that utilizes a heuristic optimization framework for video image evaluation. While it is envisioned that the heuristic optimization framework would use genetic algorithms, it should be understood that other types of heuristic optimization, such as simulated annealing and tabu search could be used.

At step 310, a plurality of system optimization designs comprising unique combinations of a plurality of genetic algorithms are applied to optimize the video image input, with each combination tested resulting in a modified image.

At step 315, these modified images are assigned a fitness value, typically by an objective image quality metric module, said image quality metric module being discussed in more detail in the previously incorporated references.

At step 320, each of the tested system optimization designs, which may include a respective modified image, are stored in a memory along with a fitness value. For purposes of illustration and not limitation, a hash-table is one such type of memory that can be used.

Steps 305–320 essentially cover a first part of the method according to the present invention, wherein an incoming video image has been optimized by different designs and evaluated.

Subsequently, at step 325 another video image is input. Prior to performing the evaluation performed on the first video input image, it is first determined whether a proposed optimization design comprises one or more of the particular combinations of genetic algorithms used in steps 305–320. If they have been previously used, they have also been previously stored (step 320). Thus step 330 involves retrieving the results from the hash-table for use with the subsequent video so as to eliminate the need for re-testing the chromosomes. The method then proceeds to step 340 to find an optimum solution for the subsequent video image evaluation.

However, if the determination at step 325 is that the combinations genetic algorithms have not been previously stored, the method will test as in step 310. Then at step 340, an optimum solution is found. It should be noted that optionally, the testing at step 340 could also be stored for future retrieval.

Various modifications can be made by a person of ordinary skill in the art that do not depart from the spirit of the invention, or the scope of the appended claims. For example, it is possible that instead of genetic algorithms, simulated annealing or a tabu search could be performed. The numbers and types of video optimization modules can be different from those illustrated, as can the memory unit and the objective image quality metric.

What is claimed is:

1. A method for decreasing the time of Video Optimization, comprising the steps of:
  (a) providing a video processing system that utilizes a heuristic optimization framework for video image evaluation of a video image input, wherein said video processing system includes a plurality of genetic algorithms;
  (b) testing a plurality of system optimization designs comprising unique combinations of the plurality of genetic algorithms applied to optimize the video image so as to result in plurality of modified images;
  (c) assigning a fitness value to each of the plurality of system optimizations in step (b) based on an objective image quality metric evaluation of the modified images;
  (d) storing each of the tested system optimization designs including a respective modified image and associated fitness value in a memory;
  (e) prior to performing a subsequent video image evaluation, determining whether a proposed system optimization design comprises one or more particular combinations of genetic algorithms that have been previously tested in step (b) and stored in the memory; and one of:
  (f)(i) retrieving the results of the tested system optimization design comprising said one or more particular combinations of genetic algorithms to find an optimum solution for the subsequent video image evaluation; or
  (f)(ii) testing any combination of genetic algorithms for optimizing the subsequent video image evaluation that had not been previously tested and stored in step (b); and
  (g) finding an optimum solution for the subsequent video image evaluation based on results from step (f).

2. The method according to claim 1, wherein the storing performed in step (d) is in a hash-table.

3. The method according to claim 1, wherein step (f) (ii) further comprises storing test results of said any combination of genetic algorithms tested in step (f) (ii) in said memory.

4. The method according to claim 1, wherein the video image input in step (a) is a broadcast image.

5. The method according to claim 1, wherein the video image input in step (a) is a previously recorded image.

6. The method according to claim 5, wherein the previously recorded image is a compressed image.

7. The method according to claim 1, wherein the testing in step (b) is performed by a system optimization unit.

8. The method according to claim 1, wherein the assigning of fitness values in step (c) is performed by an objective image quality metric module.

9. The method according to claim 8, wherein the evaluation of video images by the objective image quality metric is fed back to the system optimization unit.

10. A system for decreasing the time of Video Optimization when using genetic algorithms, said system comprising:
  means for receiving a video image input;
  a video optimization unit including a genetic algorithm module comprising a plurality of genetic algorithms;
  an objective image quality metric unit for evaluating an image quality of the video image processed by the video optimization unit according to at least one genetic algorithm and for assigning a fitness value to said video image processed by the video optimization unit;
  a storage unit for storing data regarding the image evaluated by the objective image quality metric unit and the associated fitness value of a particular combination of genetic algorithms associated with a system optimization design, wherein the data stored by the storage unit is retrievable for subsequent use when said particular combination of genetic algorithms is to be used to process a subsequent video image.

11. The system according to claim 10, wherein the storage unit comprises a hash-table.

12. The system according to claim 10, wherein the genetic algorithms in said video optimization unit optimize a plurality of video features including spatial scaling, histogram modification, adaptive peaking and noise reduction.

13. The system according to claim 10, wherein the storage unit stores the image along with the evaluation of the image quality.

14. The system according to claim 10, further comprising detection means for detecting whether said particular combination of algorithms has been previously stored in the storage unit.

15. The system according to claim 10, wherein the means for receiving includes means for receiving a video broadcast.

16. The system according to claim 10, wherein the means for receiving includes means for receiving a video stream.

* * * * *